United States Patent
Jung et al.

(10) Patent No.: US 11,289,961 B2
(45) Date of Patent: Mar. 29, 2022

(54) MOTOR

(71) Applicant: LG INNOTEK CO., LTD., Seoul (KR)

(72) Inventors: Hyo Yun Jung, Seoul (KR); Dong Keun Lee, Seoul (KR); Ju Yeon Won, Seoul (KR); Seok Bae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 60 days.

(21) Appl. No.: 16/649,912

(22) PCT Filed: Sep. 21, 2018

(86) PCT No.: PCT/KR2018/011250
§ 371 (c)(1),
(2) Date: Mar. 23, 2020

(87) PCT Pub. No.: WO2019/059715
PCT Pub. Date: Mar. 28, 2019

(65) Prior Publication Data
US 2020/0313480 A1 Oct. 1, 2020

(30) Foreign Application Priority Data

Sep. 22, 2017 (KR) .................. KR10-2017-0122480
Jan. 3, 2018 (KR) .................. KR10-2018-0000730

(51) Int. Cl.
*H02K 21/16* (2006.01)
*H02K 1/278* (2022.01)

(52) U.S. Cl.
CPC ............. *H02K 1/278* (2013.01); *H02K 21/16* (2013.01)

(58) Field of Classification Search
CPC ................................ H02K 1/278; H02K 21/16
(Continued)

(56) References Cited

U.S. PATENT DOCUMENTS

2002/0180304 A1  12/2002  Knauff
2012/0098372 A1  4/2012   Sajikawa
(Continued)

FOREIGN PATENT DOCUMENTS

DE  10-2004-026453 A1  12/2004
EP  2 757 663 A1       7/2014
(Continued)

OTHER PUBLICATIONS

International Search Report in International Application No. PCT/KR2018/011250, filed Sep. 21, 2018.
(Continued)

*Primary Examiner* — Terrance L Kenerly
(74) *Attorney, Agent, or Firm* — Saliwanchik, Lloyd & Eisenschenk

(57) ABSTRACT

An embodiment provides a motor comprising: a stator including a through hole; a cylindrical rotor which is disposed in the through hole; a rotor center shaft which is formed in the central region of the rotor and to which a rotary shaft is coupled; and a first magnet and a second magnet which are disposed between the stator and the rotor, wherein: the rotor includes an outer contour portion and a patterned portion formed between the outer contour portion and the rotor center shaft; the patterned portion includes a plurality of unit patterns and a hollow portion formed in each of the unit patterns; the outer contour portion includes an outer circumferential surface on which the first magnet and the second magnet are disposed and an inner circumferential surface which comes in contact with the plurality of unit patterns; the inner circumferential surface of the outer contour portion further includes a first protrusion portion protruding in a first direction toward the rotor center shaft; and in the first direction, the maximum length of the first
(Continued)

protrusion portion is greater than the maximum length of each of the unit patterns.

20 Claims, 12 Drawing Sheets

(58) Field of Classification Search
USPC .................................... 310/156.56, 156.53
See application file for complete search history.

(56) References Cited

U.S. PATENT DOCUMENTS

| 2014/0062252 A1* | 3/2014 | Nagahi | ................ | H02K 1/2766 |
| | | | | 310/216.048 |
| 2014/0239748 A1* | 8/2014 | Herz | ........................ | H02K 1/30 |
| | | | | 310/43 |

FOREIGN PATENT DOCUMENTS

| EP | 3 062 419 A1 | 8/2016 |
| JP | 2000-228839 A | 8/2000 |
| JP | 2010-220388 A | 9/2010 |
| JP | 2014-45630 A | 3/2014 |
| JP | 2017-112764 A | 6/2017 |

OTHER PUBLICATIONS

Supplementary European Search Report dated May 3, 2021 in European Application No. 18858976.6.

* cited by examiner

MOTOR

CROSS-REFERENCE TO RELATED APPLICATIONS

This application is the U.S. national stage application of International Patent Application No. PCT/KR2018/011250, filed Sep. 21, 2018, which claims the benefit under 35 U.S.C. § 119 of Korean Application Nos. 10-2017-0122480, filed Sep. 22, 2017; and 10-2018-0000730, filed Jan. 3, 2018; the disclosures of each of which are incorporated herein by reference in their entirety.

TECHNICAL FIELD

The present invention relates to a motor.

BACKGROUND ART

Generally, in the motor, a rotor rotates due to an electromagnetic interaction between the rotor and a stator. In this case, a rotary shaft inserted into the rotor also rotates to generate a rotational driving force.

Further, lately, the motor is being used in automobiles, home appliances, robots, and the like and demand is rapidly increasing. However, the rotor may have a form in which metal plates are simply laminated in an axial direction in which the rotation shaft rotates. Accordingly, the rotor is formed of the metal plates even in a portion which is not electromagnetically affected and thus there is problem that a weight of the rotor is increased.

Further, the motor has a limit in that the power density is lowered due to the weight of the rotor.

DISCLOSURE

Technical Problem

An embodiment of the present invention is directed to providing a lightweight motor.

Further, an embodiment of the present invention is directed to providing a motor of which power density is improved.

In addition, an embodiment of the present invention is directed to providing a motor which inhibits torque reduction.

In addition, an embodiment of the present invention is directed to providing a motor in which durability is improved by securing structural strength in the outside of the rotor.

Problems to be solved by the present invention are not limited to the above-described problems, and purposes and effects understood from solutions and embodiments which will be described below are also included.

Technical Solution

One aspect of the present invention provides a motor including a stator including a through hole, a cylindrical rotor disposed in the through hole, a rotor center axis formed in a central region of the rotor and to which a rotary shaft is coupled, and a first magnet and a second magnet disposed between the stator and the rotor, wherein the rotor includes an outer contour portion and a patterned portion disposed between the outer contour portion and the center axis of the rotor, the patterned portion includes a plurality of unit patterns and a hollow portion disposed in each of the unit patterns, the outer contour portion includes an outer circumferential surface on which the first magnet and the second magnet are disposed and an inner circumferential surface which comes in contact with the plurality of unit patterns, the inner circumferential surface of the outer contour portion further includes a first protrusion portion protruding in a first direction which is a direction toward the rotor center axis, and a maximum length of the first protrusion portion in the first direction is greater than a maximum length of each of the unit patterns.

A first separation portion formed as a space between the first magnet and the second magnet may be further included on the outer circumferential surface of the outer contour portion.

The first protrusion portion may be disposed in a virtual straight line which connects the central axis and a center of the first separation portion.

The plurality of unit patterns of the patterned portion may be disposed in the virtual straight line which connects the central axis and the center of the first separation portion.

The inner circumferential surface of the outer contour portion may further include a second protrusion portion which is spaced apart from the first protrusion portion and protrudes in the first direction.

The motor may further include a third magnet disposed between the stator and the rotor, and the third magnet may be adjacent to the second magnet.

The motor may further include a second separation portion formed as a space between the second magnet and the third magnet, and the second protrusion portion may be disposed in a virtual straight line which connects the central axis and a center of the second separation portion.

The plurality of unit patterns of the patterned portion may be disposed in the virtual straight line which connects the central axis and the center of the second separation portion.

A size of a cross section of one of the first protrusion portion and the second protrusion portion may be 110% to 350% of a size of a cross section of one of the first separation portion and the second separation portion.

A width of one of the first protrusion portion and the second protrusion portion in a second direction which is perpendicular to the first direction may be decreased in a direction closer to the central axis.

The outer contour portion may have a first thickness in the first direction, one of the first protrusion portion and the second protrusion portion in the first direction may have a second thickness, and the first thickness may be smaller than the second thickness.

The first thickness may be 80% to 110% of the second thickness.

The patterned portion may be exposed to the outside of the rotor.

Meanwhile, another aspect of the present invention provides a motor including a stator including a through hole, a cylindrical rotor disposed in the through hole, a rotor center axis formed in a central region of the rotor and to which a rotary shaft is coupled, and a first magnet, a second magnet, and a third magnet disposed between the stator and the rotor, wherein the rotor includes an outer contour portion and a patterned portion disposed between the outer contour portion and the center axis of the rotor, the patterned portion includes a plurality of unit patterns and a hollow portion disposed in each of the unit patterns, the outer contour portion includes an outer circumferential surface on which the first magnet, the second magnet, and the third magnet are disposed and an inner circumferential surface which comes in contact with the plurality of unit patterns, the inner circumferential surface of the outer contour portion further includes a first protrusion portion protruding in a first direction which is a direction toward the rotor center axis and a second protrusion portion which is disposed adjacent to the first protrusion portion and protrudes in the first direction, and the plurality of unit patterns of the patterned portion are disposed between the first protrusion portion and the second protrusion portion.

The motor may further include a first separation portion formed as a space between the first magnet and the second magnet, and the first protrusion portion may be disposed in a virtual straight line which connects the central axis and a center of the first separation portion.

The plurality of unit patterns of the patterned portion may be disposed in the virtual straight line which connects the central axis and the center of the first separation portion.

The motor may further include a second separation portion formed as a space between the second magnet and the third magnet, and the second protrusion portion may be disposed in a virtual straight line which connects the central axis and a center of the second separation portion.

The plurality of unit patterns of the patterned portion may be disposed in the virtual straight line which connects the central axis and the center of the second separation portion.

A width of one of the first protrusion portion and the second protrusion portion in a second direction which is perpendicular to the first direction may be decreased in a direction closer to the central axis.

The patterned portion may be exposed to the outside of the rotor.

Still another aspect of the present invention provides a motor including a rotary shaft, a stator including a hole through which the rotary shaft passes, a rotor disposed in the stator, and a magnet disposed between the rotor and the stator, wherein the rotor includes a rotor core including a groove, a patterned portion disposed in the groove and including a plurality of openings, and the groove is disposed in the rotor.

The patterned portion may come into contact with the rotary shaft.

A diameter ratio between a diameter of the rotor core from the rotary shaft and a diameter of the patterned portion from the rotary shaft may be smaller than 1:0.5.

The opening may include a plurality of sides, and a maximum length of each of the plurality of sides is 1 mm to 1.75 mm.

The patterned portion may include a first frame disposed in a direction of the rotary shaft and a second frame disposed in a direction perpendicular to the direction of the rotary shaft.

An interval between facing sides among the plurality of sides may be greater than a minimum interval between the plurality of openings.

The magnet may be disposed at an outer side of the rotor core.

Advantageous Effects

According to an embodiment of the present invention, a motor of which power density is improved can be implemented.

Further, according to the embodiment of the present invention, a motor which inhibits torque reduction can be implemented.

In addition, according to the embodiment of the present invention, a motor in which durability is improved by securing structural strength in the outside of a rotor can be implemented.

Various useful advantages and effects of the present invention are not limited to the above and may be relatively easily understood in a process of describing exemplary embodiments of the present invention.

MODES OF THE INVENTION

Figure 1:
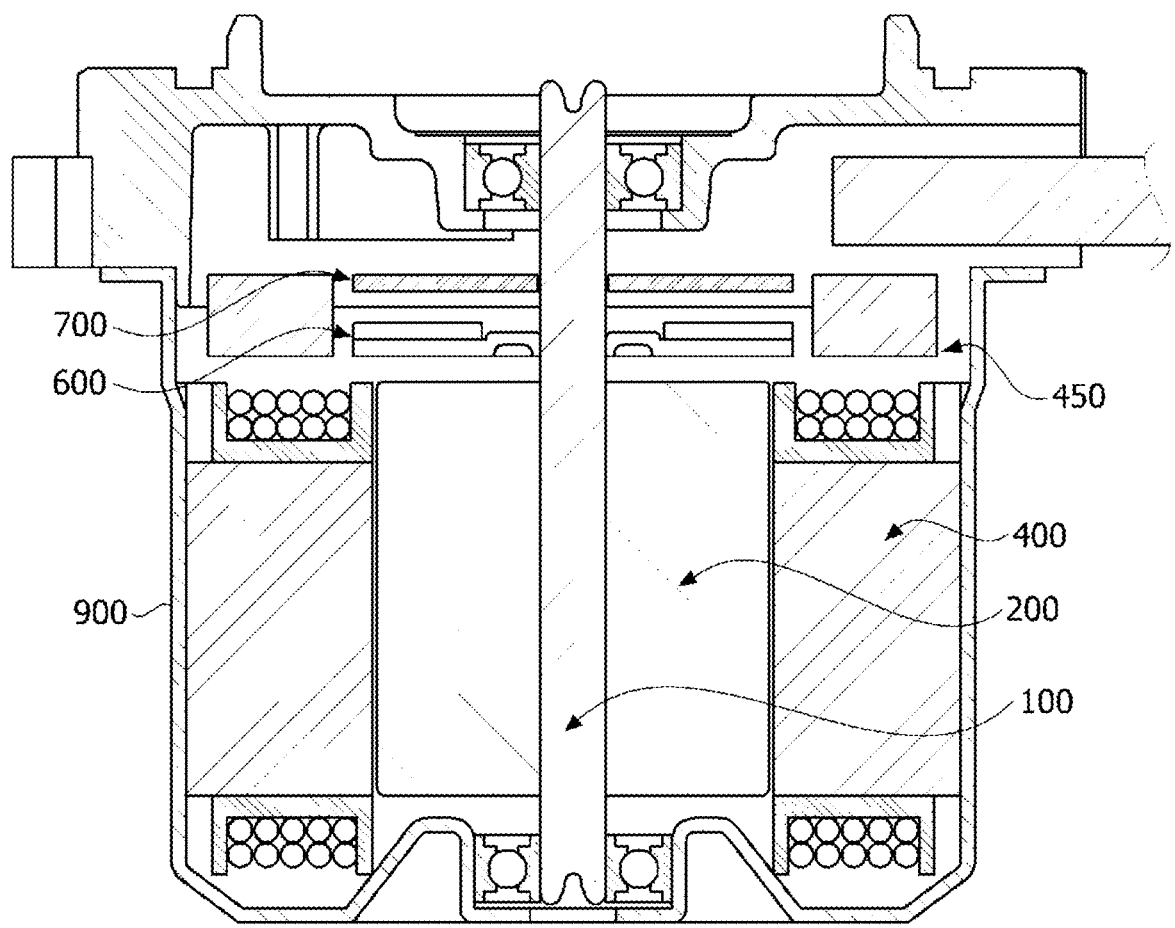
FIG. 1 is a schematic view of a motor according to a first embodiment.

Since the present invention may be variously changed and have various embodiments, particular embodiments will be exemplified and described in the drawings. However, the present invention is not limited to the particular embodiments and includes all changes, equivalents, and substitutes within the spirit and the scope of the present invention.

Further, it should be understood that, although the terms "second," "first," and the like may be used herein to describe various elements, the elements are not limited by the terms. The terms are only used to distinguish one element from another. For example, a first element could be termed a second element, and similarly, a second element could be termed a first element without departing from the scope of the present invention. The term "and/or" includes any one or any combination among a plurality of associated listed items.

When predetermined components are mentioned as being "linked," or "connected" to other components, the components may be directly linked or connected to other components, but it should be understood that additional components may be present therebetween. On the other hand, when the predetermined components are mentioned as being "directly linked," or "directly connected" to other components, it should be understood that no additional components are present between the above-described components.

Terms used in the present invention are used solely to describe the particular embodiments and not to limit the present invention. The singular form is intended to also include the plural form, unless the context clearly indicates otherwise. It should be further understood that the terms "include," "including," "provide," "providing," "have," and/or "having" specify the presence of stated features, integers, steps, operations, elements, components, and/or groups thereof but do not preclude the presence or addition of one or more other features, integers, steps, operations, elements, components, and/or groups thereof.

Unless otherwise defined, all terms including technical or scientific terms used in the present invention have meanings which are the same as those of terms generally understood by those skilled in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the embodiments will be described in detail with reference to the accompanying drawing drawings, the same reference numerals are applied to the same or corresponding elements regardless of the reference numerals, and redundant description thereof will be omitted.

Figure 2:
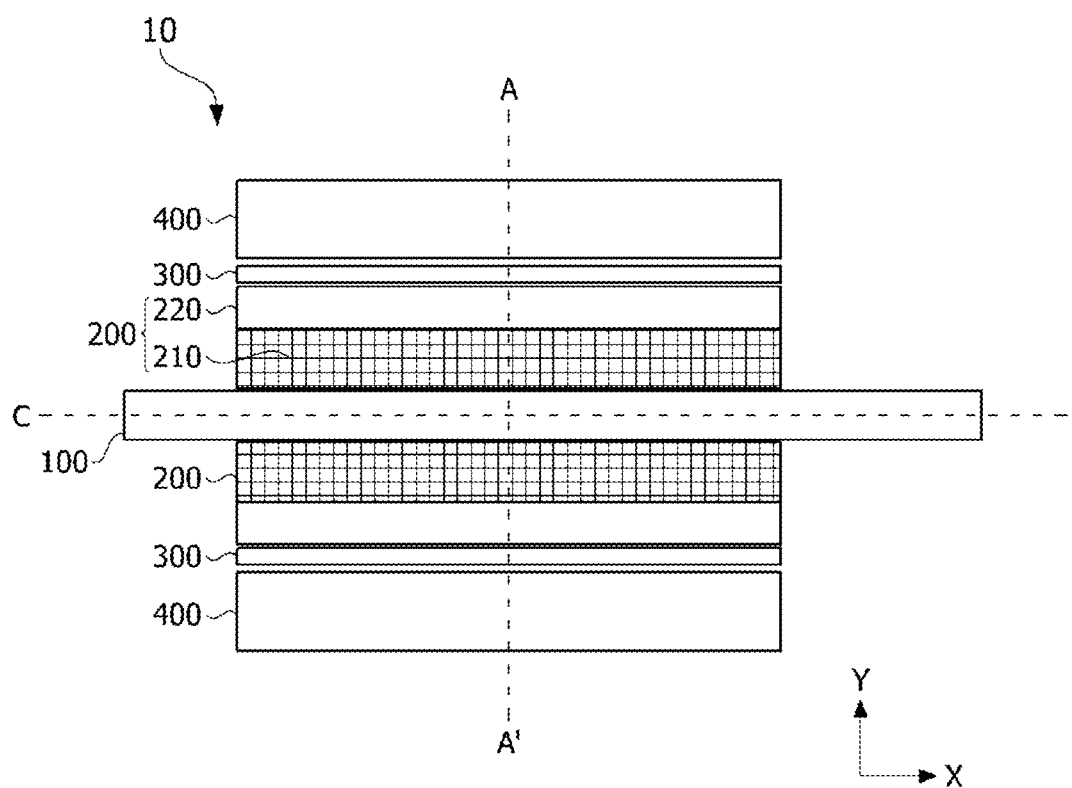
FIG. 2 is a cross-sectional view of the motor according to the first embodiment.
Figure 3:
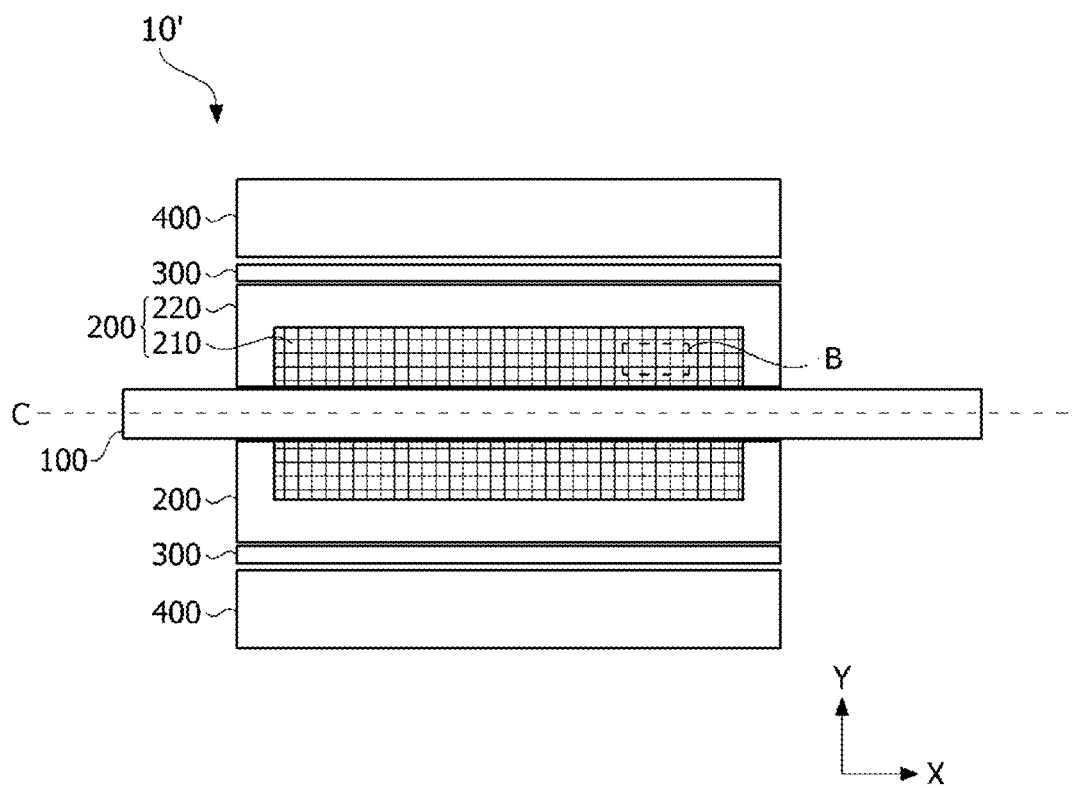
FIG. 3 is a modification of FIG. 2.
Figure 4:
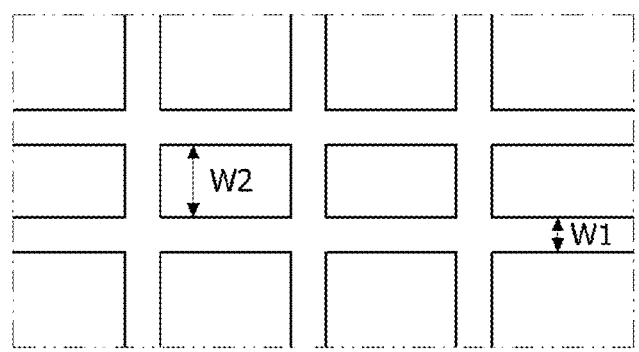
FIG. 4 is an enlarged view of B in FIG. 3.
Figure 5:
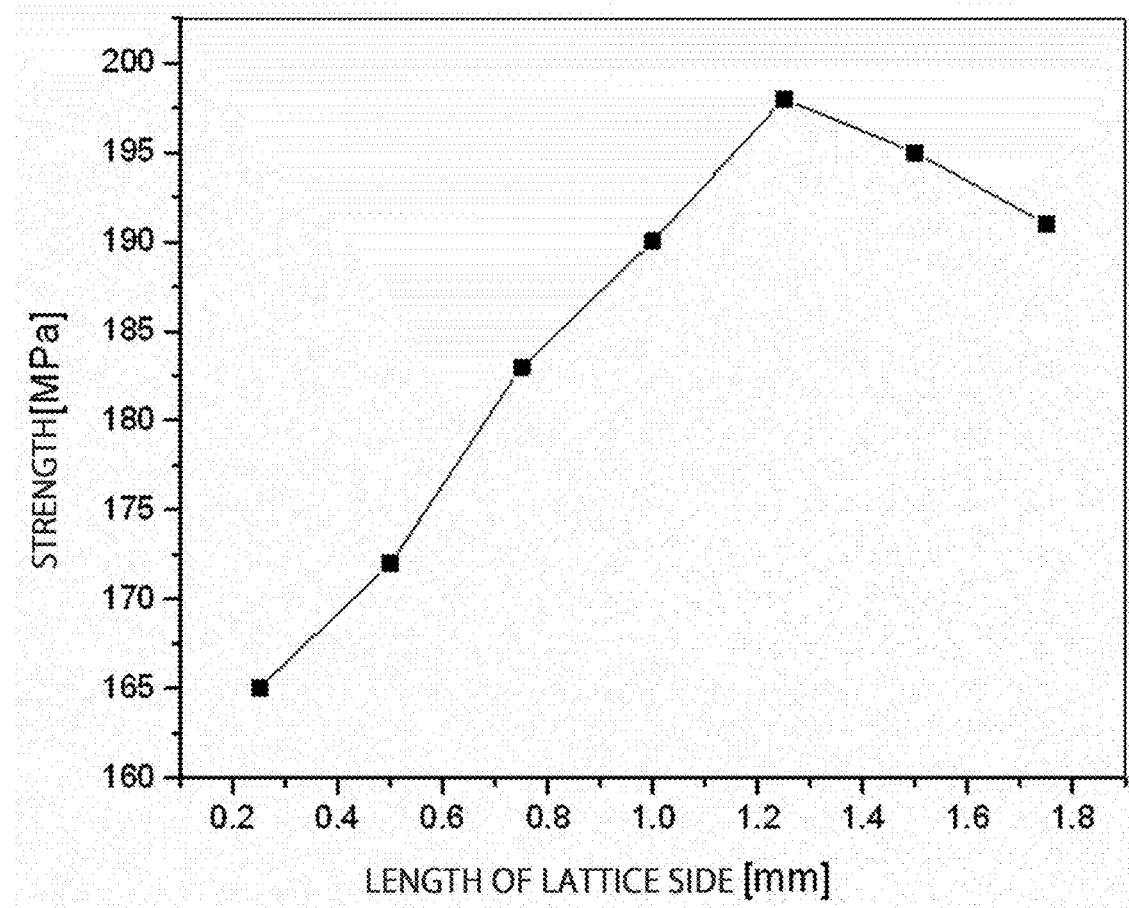
FIG. 5 is a view for describing an effect of a maximum length of each of sides of a hollow portion.
Figure 6:
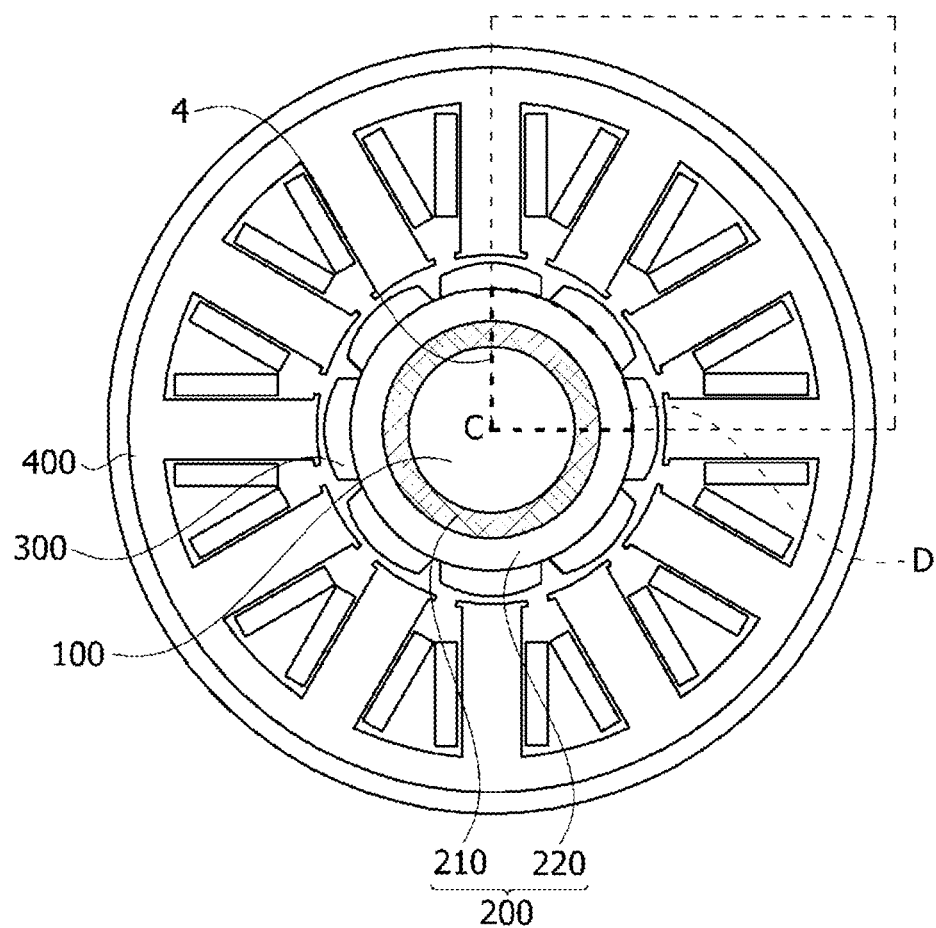
FIG. 6 is a cross-sectional view taken along line A-A' in FIG. 2.
Figure 7:
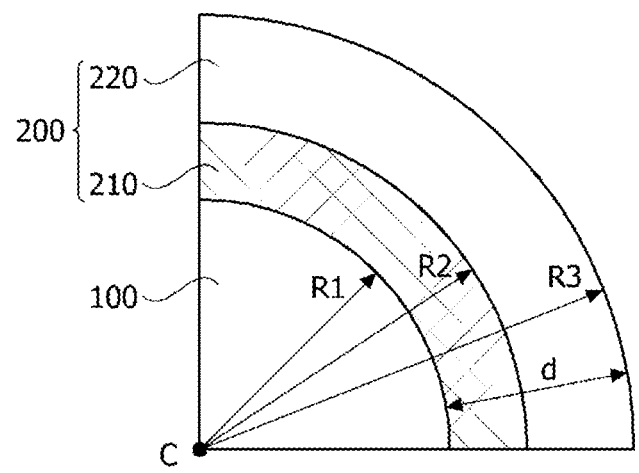
FIG. 7 is an enlarged view of portion D in FIG. 6.
Figure 8C:
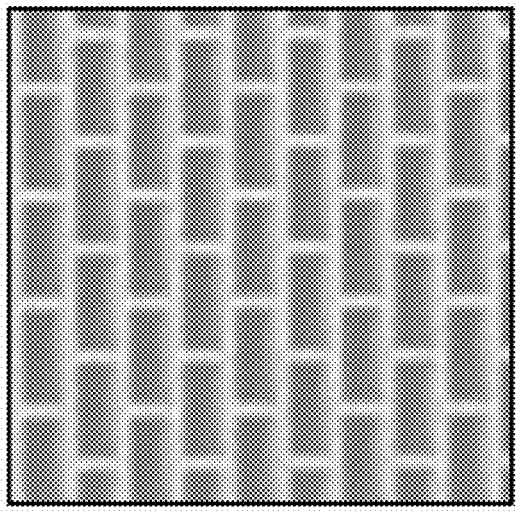
FIG. 8 is a view illustrating various embodiments of a patterned portion of a rotor.
Figure 8B:
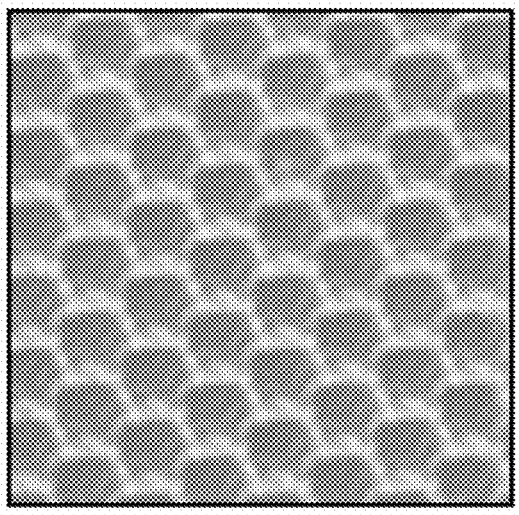
Figure 8A:
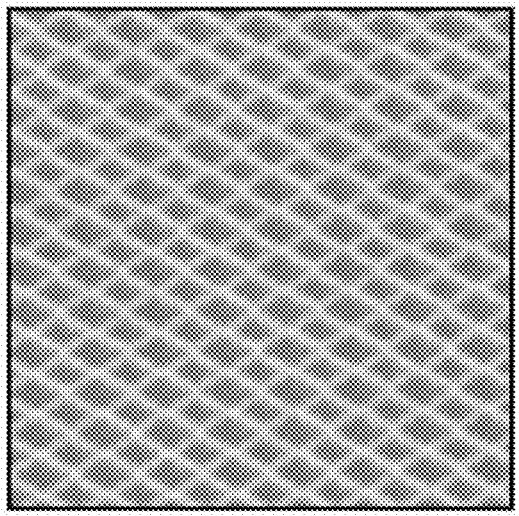
Figure 9:
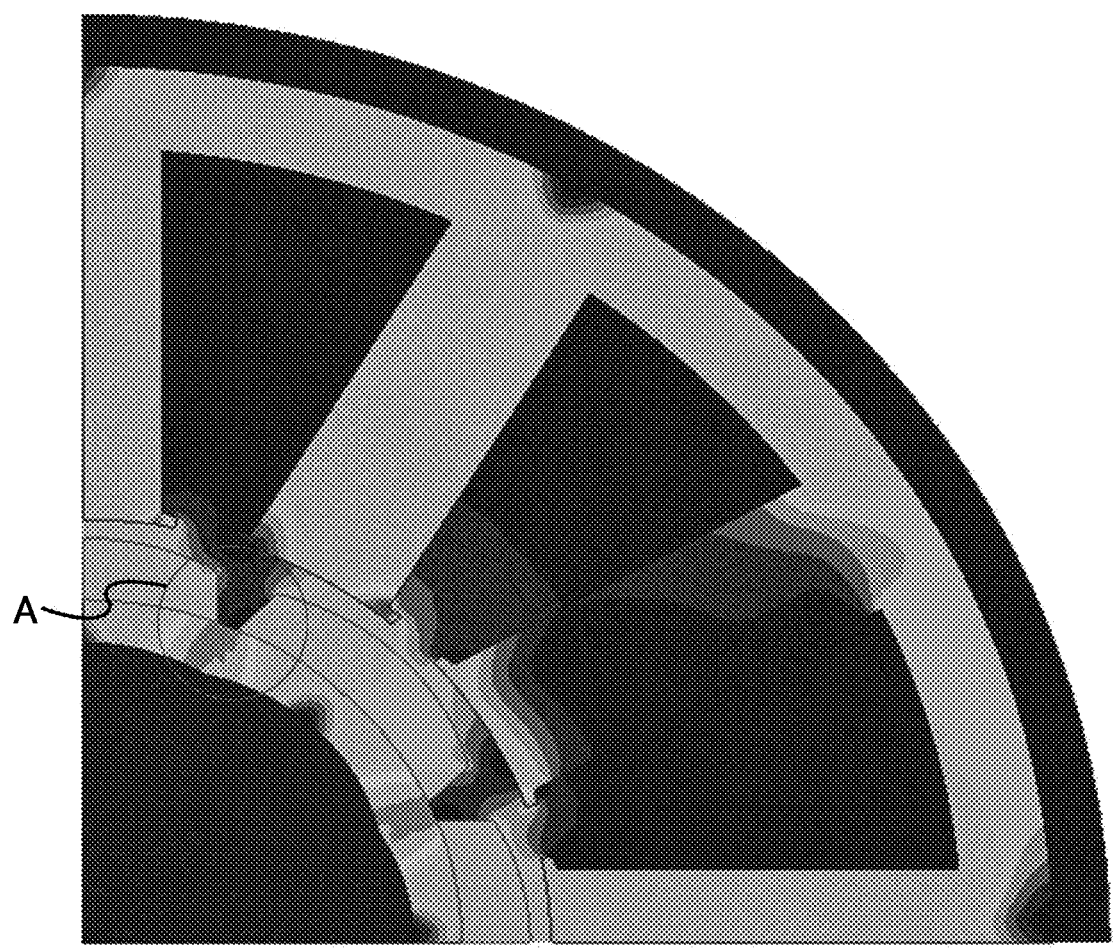
FIG. 9 is an image illustrating a magnetic analysis distribution of a fourth region in FIG. 6.

FIG. 1 is a schematic view of a motor according to a first embodiment, FIG. 2 is a cross-sectional view of the motor according to the first embodiment, FIG. 3 is a modification of FIG. 2, FIG. 4 is an enlarged view of B in FIG. 3, FIG. 5 is a view for describing an effect of a maximum length of each of sides of a hollow portion, FIG. 6 is a cross-sectional view taken along line A-A' in FIG. 2, FIG. 7 is an enlarged view of portion D in FIG. 6, FIG. 8 is a view illustrating various embodiments of a patterned portion of a rotor, and FIG. 9 is an image illustrating a magnetic analysis distribution of a fourth region in FIG. 6.

Referring to FIGS. 1 and 2, a motor 10 according to the first embodiment includes a rotary shaft 100, a rotor 200, a magnet 300, and a stator 400. First, the rotary shaft 100 may be disposed at a center of the motor 10. For example, the rotary shaft 100 may be disposed on a central axis C of the motor 10. Further, the rotary shaft 100 may be coupled to the rotor 200. More specifically, when an electromagnetic interaction between the rotor 200 and the stator 400 occurs due to supply of currents, the rotor 200 rotates, and thus the rotary shaft 100 may rotate. In this case, the rotary shaft 100 may rotate with respect to the central axis C to transfer power to an external device. Further, the rotary shaft 100 may have a cylindrical shape, and the central axis C may be a straight line which connects centers of circles in the rotary shaft 100.

The rotary shaft 100 may be surrounded by the rotor 200, the magnet 300, and the stator 400 which will be described later. The rotor 200, the magnet 300, and the stator 400 may have a longer separation distance from the central axis C in order of the rotor 200, the magnet 300, and the stator 400. Further, the rotary shaft 100 may pass through the rotor 200, the magnet 300, and the stator 400.

The rotor 200 causes an electrical interaction with the stator 400 and may rotate through the caused electrical interaction. The rotary shaft 100 may also rotate in conjunction with rotation of the rotor 200. The rotary shaft 100 may be connected to power bodies of various devices to transmit power to the power bodies. For example, the rotary shaft may be connected to a mobile device or a joint part of a robot to adjust a height of the lens to adjust the lens magnification of the mobile device or to rotate an arm or the like of the robot.

Meanwhile, the rotor 200 may be implemented in a shape in which a plurality of plates having a form of a circular thin steel plate are stacked or in a single cylindrical form.

Further, a hole to which the rotary shaft 100 is coupled may be disposed in a center of the rotor 200. In addition, the rotary shaft 100 may be inserted into the hole.

The rotor 200 may include a patterned portion 210 and a rotor core 220.

First, the rotor core 220 may include a groove. The groove may be formed in an inner surface of the rotor 200. That is, the groove may be disposed at the inside of the rotor core 220.

The patterned portion 210 may be disposed in the groove. That is, the patterned portion 210 may be disposed adjacent to the rotary shaft 100. The patterned portion 210 may be disposed to come into contact with the rotary shaft 100. Accordingly, the patterned portion 210 may come into contact with the rotary shaft 100.

Further, the patterned portion 210 may include a plurality of unit patterns and hollow portions disposed in the unit patterns. Further, the hollow portions may include a plurality of hollows. The patterned portion 210 may form a lattice structure due to the plurality of hollows. Accordingly, a lattice structure may be formed adjacent to the through hole in the rotor 200. By such a configuration, the motor 10 according to the first embodiment has the patterned portion including the hollows located inside the rotor 200 and thus the electrical interaction between the stator 400 and the rotor 200 occurring from an outer side of the rotor 200 may not be hindered. Further, since the patterned portion 210 includes the hollows, manufacturing costs of the motor 10 according to the embodiment are reduced, the weight of the motor decreases, and the power density of the motor may be improved. Here, the power density refers to a size of the motor in comparison with power of the motor, and improvement in the power density means that the motor is reduced in size under the same power (torque).

The rotor core 220 may be disposed at the outer side of the rotor 200. Further, as a modification, the groove of the rotor core 220 may be a hollow. The magnet 300 may be disposed on an outer circumferential surface or at the outer side of the rotor 200. When the magnet is a surface permanent magnet (SPM) type attached to the outer circumferential surface of the rotor 200, a plurality of magnets may be disposed at a predetermined interval along the outer circumferential surface of the rotor 200. Alternatively, in an interior surface magnet (IPM) type in which magnets are buried into the rotor 200, a plurality of magnets may be buried at a predetermined interval in the rotor 200. Further, the rotor 200 may include a can member (not shown). The can member (not shown) fixes the magnets to inhibit separation of the magnets from the rotor and inhibits exposure of the magnets by surrounding the magnets.

For example, the magnet 300 may be disposed on the rotor core 220. Further, a molding part may be disposed to surround the magnet 300 and the rotor core 220, and the molding part may couple the magnet 300 and the rotor core 220. For example, the molding part may be formed by double injection in a state of including the rotor core 220 and the magnet. Further, the molding part may be formed to surround only some of an inner circumferential surface of the magnet 300 with respect to a direction of the central axis C but is not limited thereto. The magnet 300 may be disposed on the rotor core 220 to have a concentric axis with the rotor core 220. The magnet 300 may be coupled to an outer circumferential surface of the rotor core 220.

Further, the magnet 300 may be magnetized into a plurality of poles. The magnet 300 may be concentrically disposed with the central axis C. Accordingly, the magnet 300 and the rotor 200 may have the same central axis C. The magnet 300 may cause signals for detecting a rotating position of the rotor core 220. Further, the magnet 300 may be implemented in a ring shape. The magnet 300 may include a hole through which the rotary shaft 100 passes in a center thereof.

A coil may be wound around the stator 400 to cause the electrical interaction between the stator 400 and the rotor 200. A specific configuration of the stator 400 for winding the coil will be described later. The stator 400 may include a stator core including a plurality of teeth. The stator core may be provided with a ring-shaped yoke portion, and the teeth on which the coil is wound in a center direction may be provided along the yoke. The teeth may be provided at a predetermined interval along an outer circumferential surface of the yoke portion. Meanwhile, a plurality of plates each formed as a thin steel plate may be stacked to form the stator core. Further, a plurality of divided cores may be coupled or connected to each other to form the stator core. In addition, the stator 400 may include a through hole into which the rotary shaft 100, the rotor 200, and the magnet 300 are inserted. The stator 400 may have the greatest diameter in comparison with the rotary shaft 100, the rotor 200, and the magnet 300 with respect to the central axis C.

Further, the motor 10 may include a bus bar 450. The bus bar 450 may be disposed on the stator 400. The bus bar 450 may include a terminal in a ring-shaped mold member.

A housing 900 of the motor 10 may accommodate the rotor 200 and the stator 400 therein. The housing 900 may include a body and a bracket. The body has a cylindrical shape. The body may be formed of a metal material such as aluminum. Further, an upper portion of the body is opened. The bracket covers the opened upper portion of the body. The stator 400 is disposed at an inner side of the body, and the rotor 200 may be disposed at an inner side of the stator 400. Bearings may be disposed at a center portion of the bracket. The bearings may be integrated with the bracket by double injection.

A sensing magnet 600 is an apparatus coupled to the rotary shaft 100 to be linked to the rotor 200 to detect a position of the rotor 200.

A sensor which senses a magnetic force of the sensing magnet 600 may be disposed in a printed circuit board 700. In this case, the sensor may be a Hall IC. The sensor senses a change in the N pole and the S pole of the sensing magnet 600 to generate sensing signals.

Referring to FIG. 3, in a motor 10' according to the modification, the patterned portion 210 may be disposed in the rotor core 220. In this case, a portion of an inner side surface of the rotor core 220 may come into contact with the rotary shaft 100. That is, the rotor core 220 may be disposed to surround the patterned portion 210. Accordingly, since the patterned portion 210 does not come into contact with the rotary shaft 100, and the inner side surface of the rotor core 220 comes into contact with the rotary shaft 100, a coupling force between the rotary shaft 100 and the rotor 200 may be improved.

Referring to FIG. 4, as described above, the patterned portion 210 may include a plurality of hollows. Further, the hollow may include a plurality of sides. Specifically, the patterned portion 210 may include a first frame disposed to be elongated in a direction of the rotation axis (X-axis direction) and a second frame disposed in a direction perpendicular to the direction of the rotation axis (Y-axis direction). The first frame may have a length in the X-axis direction greater than a length of the second frame in the Y-axis direction.

Further, in the hollow, an interval between facing sides among the plurality of sides may be greater than a minimum interval between the plurality of hollows. By such a configuration, since areas of the hollow portions opened in an entire area of the patterned portion increase, the power density may be improved.

Further, a maximum length W2 of each of the plurality of sides may be 1 mm to 1.75 mm. By such a configuration, in the motor according to the embodiment, the power density may be improved without degradation of an electromagnetic action between the stator and the rotor. Here, the interval between the hollows may be a length in a first direction (the X-axis direction) or a second direction (the Y-axis direction). Further, the maximum length of each of the plurality of sides may be a length in the second direction (the Y-axis direction). In addition, the first direction (the X-axis direction) may be the same as the direction of the central axis C, and the second direction (the Y-axis direction) may be a direction perpendicular to the direction of the central axis C.

Referring to Table 1 below, in the case in which the patterned portion was not present (Comparative Example), strength MPa generated from the motor when a length of a pattern side (the maximum length of each of the plurality of sides in the hollow) was adjusted to 0.25 mm (Experimental Example 1), 0.50 mm (Experimental Example 2), 0.75 mm (Experimental Example 3), 1.00 mm (Embodiment 1), 1.25 mm (Embodiment 2), 1.50 mm (Embodiment 3), and 1.75 mm (Embodiment 4) was measured. In this case, an interval W1 between a plurality of patterns was set to 0.25 mm. Further, the thickness of the patterned portion was 0.5 times the thickness of the rotor and was disposed to come into contact with an inner side of the rotor. Here, the thickness refers to a length in a direction perpendicular to the central axis C.

TABLE 1

| | Length of pattern side [mm] | Strength [MPa] |
|---|---|---|
| Comparative Example | | 165 |
| Experimental Example 1 | 0.25 | 165 |
| Experimental Example 2 | 0.50 | 172 |
| Experimental Example 3 | 0.75 | 183 |
| Embodiment 1 | 1.00 | 190 |
| Embodiment 2 | 1.25 | 198 |
| Embodiment 3 | 1.50 | 195 |
| Embodiment 4 | 1.75 | 191 |

Further, referring to FIG. 5, in Table 1, the strength according to the length of the pattern side is shown as a graph. Referring to Table 1 and FIG. 3, when the patterned portion was not present (Comparative Example), or the length of the pattern side was 0.25 mm (Experimental Example 1), it was shown that the strength was the same as 165 MPa. Further, it was shown that when the length of the pattern side was 0.50 mm (Experimental Example 2), the strength was 172 MPa, and when the length of the pattern side was 0.75 mm (Experimental Example 3), the strength was 183 MPa. On the other hand, it was shown that when the length of the pattern side was 1.00 mm (Embodiment 1), the strength was 190 MPa, when the length of the pattern side was 1.25 mm (Embodiment 2), the strength was 198 MPa, when the length of the pattern side was 1.50 mm (Embodiment 3), the strength is 195 MPa, and when the length of the pattern side was 1.75 mm (Embodiment 4), the strength was 191 MPa.

As described above, when the maximum length W2 of each of the plurality of sides is 1 mm to 1.75 mm, the patterned portion of the motor according to the embodiment may provide improved strength.

Further, referring to Table 2 below, in the case in which the patterned portion was not present (Comparative Example), torque Nm and power density W/mm3 generated from the motor when a length of a pattern side (the maximum length of each of the plurality of sides in the hollow) was adjusted to 1 mm (Embodiment 1), 2 mm (Experimental Example 4), 3 mm (Experimental Example 5), 4 mm (Experimental Example 6), and 5 mm (Experimental Example 7) were measured. In this case, an interval W1 between a plurality of patterns was set to 0.25 mm. Further, the thickness of the patterned portion was 0.5 times the thickness of the rotor and was disposed to come into contact with an inner side of the rotor. Here, the thickness refers to a length in a direction perpendicular to the central axis C.

TABLE 2

| | Length of pattern side [mm] | Torque [Nm] | Power density [W/mm³] |
|---|---|---|---|
| Comparative Example | | 6.5 | 60.00 |
| Embodiment 1 | 1 | 6.4 | 60.48 |
| Experimental Example 4 | 2 | 6.4 | 61.10 |
| Experimental Example 5 | 3 | 6.4 | 61.72 |
| Experimental Example 6 | 4 | 6.5 | 62.40 |
| Experimental Example 7 | 5 | 6.5 | 62.99 |

Referring to Table 2, when the patterned portion was not present (Comparative Example), or the length of the pattern side was 1 mm (Embodiment 1), it was shown that each torque was similar at 6.5 Nm and 6.4 Nm, and each power density was 60 W/mm³ and 60.48 W/mm³. Further, it was shown that when the lengths of the pattern side were 2 mm (Experimental Example 4), 3 mm (Experimental Example 5), 4 mm (Experimental Example 6), and 5 mm (Experimental Example 7) it was shown that each torque was similar at 6.4 Nm, 6.4 Nm, 6.5 Nm, and 6.5 Nm, but each power density was 61.10 W/mm³, 61.72 W/mm³, 62.40 W/mm³, and 62.99 W/mm³. That is, since an area of the hollow increases when the length of the pattern side increases, a volume of the hollow in comparison with an entire volume of the motor increases and thus the power density may be improved. As described above, since the hollow is formed through the patterned portion, the motor according to the embodiment may provide the effect that the power density is improved.

However, like Table 1, in the patterned portion, when the maximum length W2 of each of the plurality of sides is smaller than 1 mm, there is a limit that the strength and the power density are not significantly improved, and when the maximum length W2 of each of the plurality of sides is greater than 1.75 mm, the power density may increase but there is a limit that the strength is not significantly improved.

Referring to FIGS. 6 and 7, as described above, the patterned portion 210 of the rotor 200 may be disposed at an outer side of the rotary shaft 100, the rotor core 220 may surround the outer side of the patterned portion 210, and the magnet may be disposed at the outer side of the rotor core 220. Further, the stator 400 may be disposed to be spaced apart from an outer side of the magnet 300 and to surround the rotary shaft 100, the rotor 200, and the magnet 300.

Further, as described above, the central axis C may be disposed at centers of the rotary shaft 100, the rotor 200, the magnet 300, and the stator 400.

Further, a diameter R1 of the rotary shaft 100 may be 2 mm to 3 mm with respect to the central axis C. However, the diameter is not limited thereto, and the diameter may be variously changed according to the size of the motor.

In addition, a diameter R2 of the patterned portion 210 may be 4 mm to 6 mm with respect to the central axis C. However, as described above, the diameter may be variously changed according to the size of the motor. Further, a diameter R3 of the rotor 200 (or the rotor core 220) may be 6 mm to 9 mm.

In this case, in the motor according to the embodiment, a diameter ratio between the diameter of the rotor core (or an outer contour portion which will be described later) from the rotary shaft and the diameter of the patterned portion from the rotary shaft may be smaller than or equal to 1:0.5.

Referring to Table 3 below, torque of the motor and torque ripples in the case in which diameter ratios of the diameter of the rotor core from the rotary shaft and the diameter of the patterned portion from the rotary shaft were 1:0.8, 1:0.6, 1:5, 1:0.33, and 1:02 were measured. In this case, the interval W1 between the plurality of patterns was set to 0.25 mm, and the length of each of the plurality of patterns was set to 1 mm.

TABLE 3

| Diameter ratio | Torque [Nm] | Torque ripple [Nm] |
|---|---|---|
| 1:0.8 | 6.5 | 0.152 |
| 1:0.66 | 6.5 | 0.151 |
| 1:5 | 6.5 | 0.150 |
| 1:0.33 | 6.4 | 0.147 |
| 1:0.2 | 6.3 | 0.124 |

Referring to Table 3, even when the diameter ratio was changed, it was shown that the torque was similar. However, it was shown that the torque ripple was greater than or equal to 0.150 Nm when the diameter ratio was greater than 1:0.5. Here, the torque ripple refers to deviation of the torque as a fluctuation range of the torque. As described above, since the torque ripple becomes smaller than 0.150 Nm when the diameter ratio is smaller than 0.5, the fluctuation range of the torque provided by the motor decreases and thus the lifespan of the motor may be increased and an error of power which is provided may be reduced.

That is, when the outer side of the rotor is adjacent to the stator and thus the patterned portion is located at the outer side of the rotor, since a fluctuation in the electrical interaction between the rotor and the stator occurs according to a structure change due to the hollow of the pattern, the fluctuation range of the torque may increase.

Referring to FIG. 8, the patterned portion may have various shapes. Referring to FIG. 8A, the patterned portion may have a frame in a direction inclined on the basis of the central axis C, and as shown in FIG. 8B, the patterned portion may include a honeycomb-shaped hollow (or an opening) shape. In addition, as shown in FIG. 8C, the patterned portion may be alternately disposed in a direction in which the hollow is perpendicular to the central axis C, such as a brick shape. As described above, the patterned portion may have various shapes each including a hollow, and the power density may be improved through a structure of expanding the area of the hollow portion.

However, referring to FIG. 9, since a thickness of the rotor core 220 is decreased according to formation of the patterned portion 210, and accordingly, a magnetic resistance increases in a separation area A between the magnet 300 and the magnet 300 due to a magnetic saturation phenomenon, the power density of the motor is reduced, and the torque is reduced.

Figure 10:
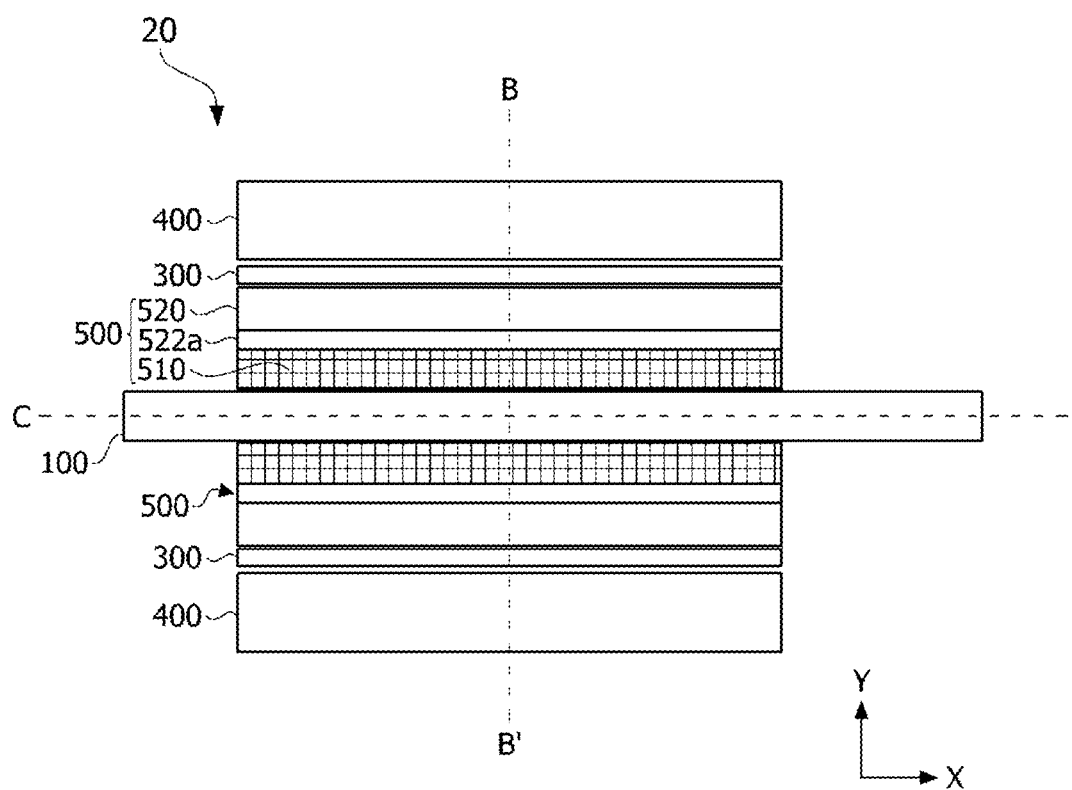
FIG. 10 is a side cross-sectional view of a motor according to a second embodiment of the present invention.
Figure 11:
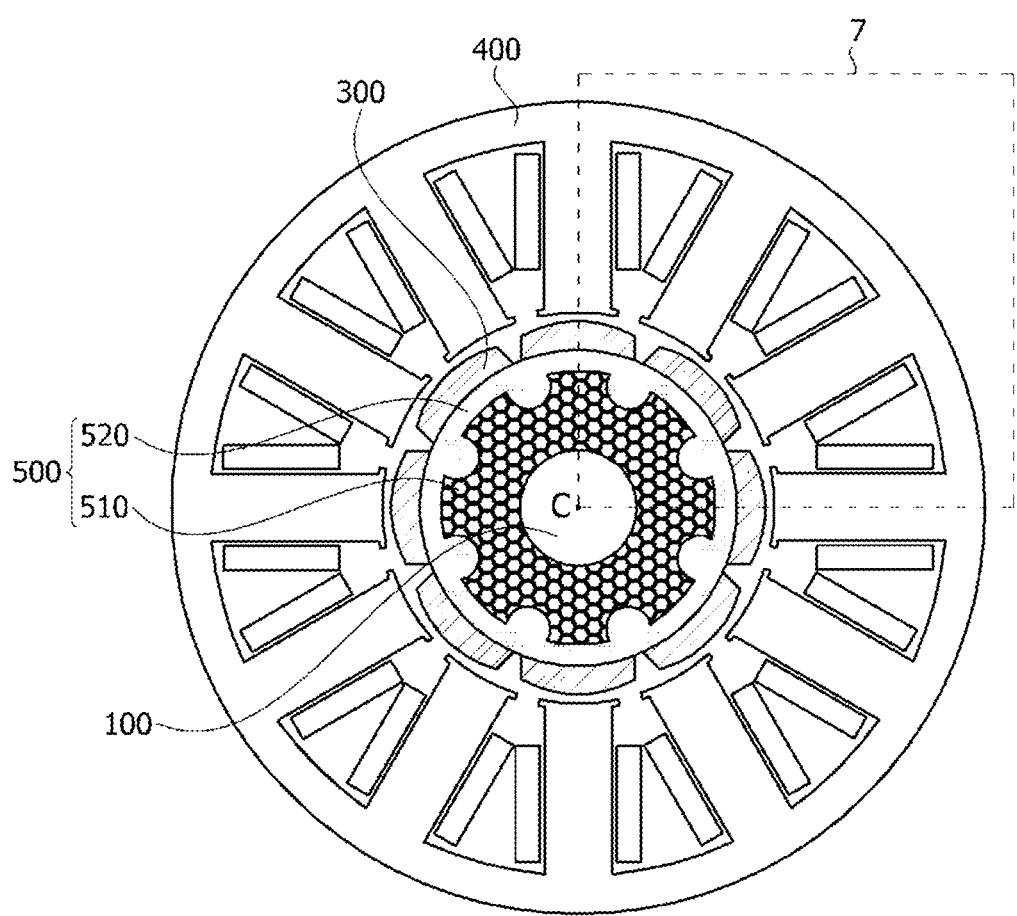
FIG. 11 is a cross-sectional view taken along line B-B' of the motor in FIG. 10.
Figure 12:
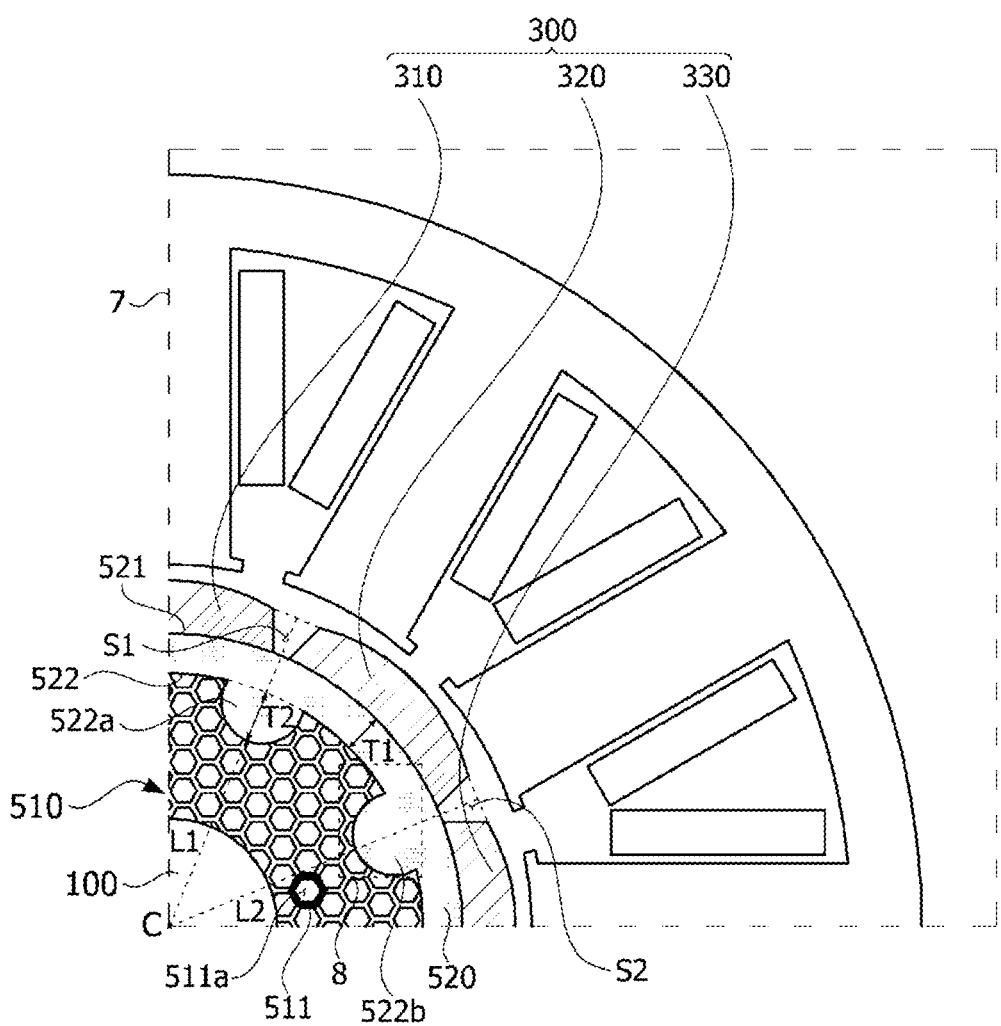
FIG. 12 is an enlarged view of a seventh region in FIG. 11.
Figure 13:
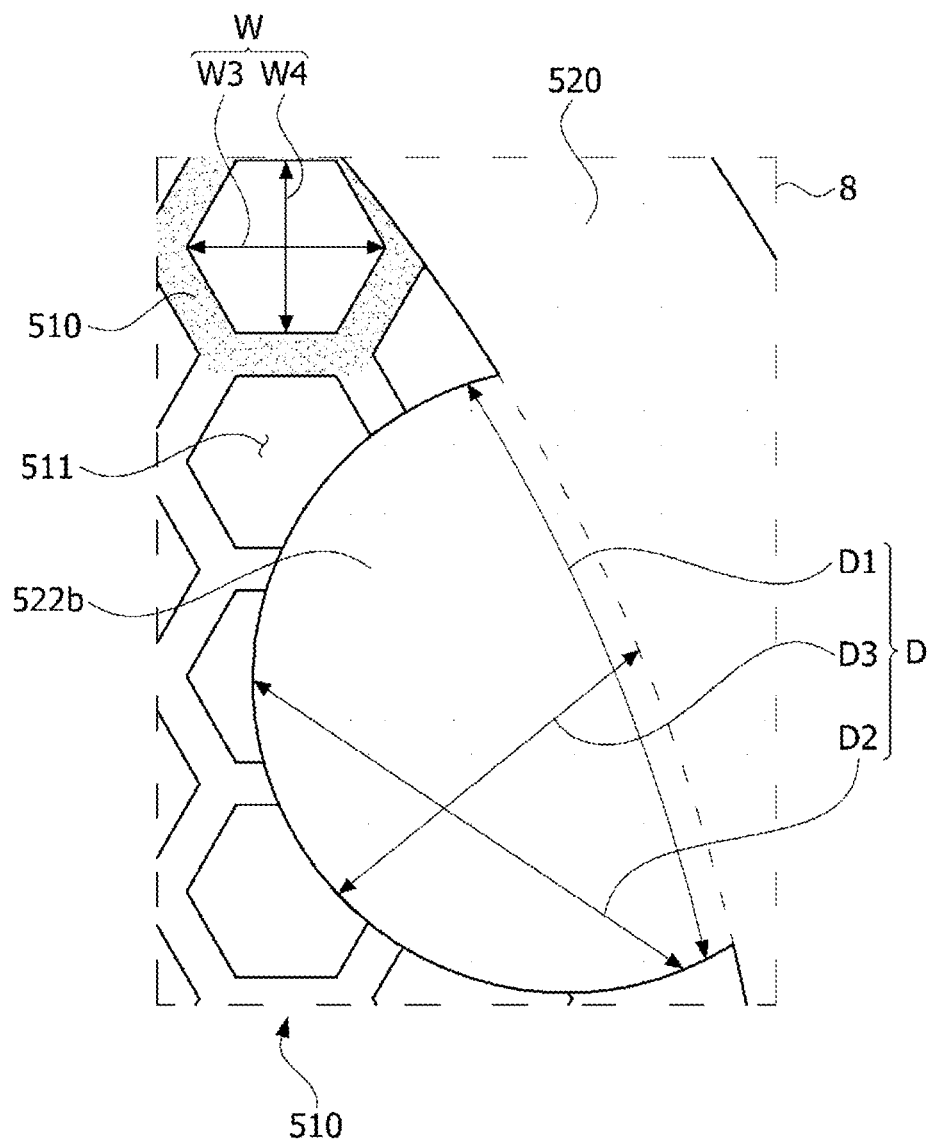
FIG. 13 is an enlarged view of an eighth region in FIG. 12.

FIG. 10 is a side cross-sectional view of a motor according to a second embodiment, FIG. 11 is a cross-sectional view taken along line B-B' of the motor in FIG. 10, FIG. 12 is an enlarged view of a seventh region in FIG. 11, and FIG. 13 is an enlarged view of an eighth region in FIG. 12.

Hereinafter, the motor according to the second embodiment of the present invention will be described with reference to FIGS. 10 to 13. However, a motor 20 according to the second embodiment of the present invention is the same as the motor shown in FIG. 2 and overlapping configurations will be described using the same reference numerals.

Referring to FIGS. 10 to 13, the motor 20 according to the second embodiment of the present invention includes a rotary shaft 100, a rotor 500, a magnet 300, and a stator 400.

The rotor 500 and the stator 400 may electrically interact. When the electrical interaction is caused, the rotor 500 may rotate. The rotary shaft 100 may also rotate in conjunction with rotation of the rotor 500. The rotary shaft 100 may be connected to power bodies of various devices to transmit power to the power bodies.

The rotary shaft 100 may be surrounded by the rotor 500, the magnet 300, and the stator 400. The rotor 500, the magnet 300, and the stator 400 may have a long separation distance from the central axis C in order of the rotor 500, the magnet 300, and the stator 400. Further, the rotary shaft 100 may pass through the rotor 500, the magnet 300, and the stator 400.

The rotor 500 may come into contact with the rotary shaft 100 and may be disposed to surround the rotary shaft 100. The rotor 500 may be integrally formed with the rotary shaft 100 or may include a first through hole through which the rotary shaft 100 passes. Further, the rotary shaft 100 may be inserted into the first through hole.

The rotor 500 may include a patterned portion 510 and an outer contour portion 520. The outer contour portion 520 may correspond to or include the above-described rotor core. The rotor 500 may be implemented in a power bed fusion (PBF) manner among metal three-dimensional (3D) printing technologies.

The patterned portion 510 may include a plurality of unit patterns 511, and each of the plurality of unit patterns 511 may be formed in an angular or circular pattern having a hollow portion 511a. That is, the patterned portion 510 may form a lattice structure or honeycomb structure.

The patterned portion 510 may be exposed to the outside.

Meanwhile, the patterned portion 510 may not be exposed to the outside and may be formed only in the rotor 500. The above will be described later.

By such a configuration, the motor 20 according to the embodiment has the patterned portion 510 including a plurality of hollow portions 511a located inside the rotor 500, and thus the electrical interaction between the stator 400 and the rotor 500 occurring from an outer side of the rotor 500 may not be hindered. Further, since the patterned portion 510 includes the hollow portions 511a, manufacturing costs of the motor 20 according to the second embodiment are reduced, the weight of the motor decreases, and the power density of the motor may be improved. Here, the power density refers to a size of the motor in comparison with power of the motor, and improvement in the power density means that the motor is reduced in size under the same power (torque).

Further, the first through hole may be formed in a central axis of the patterned portion 510.

That is, the patterned portion 510 may be disposed adjacent to the rotary shaft 100, and the patterned portion 510 may be disposed to come into contact with the rotary shaft 100.

Figure 14:
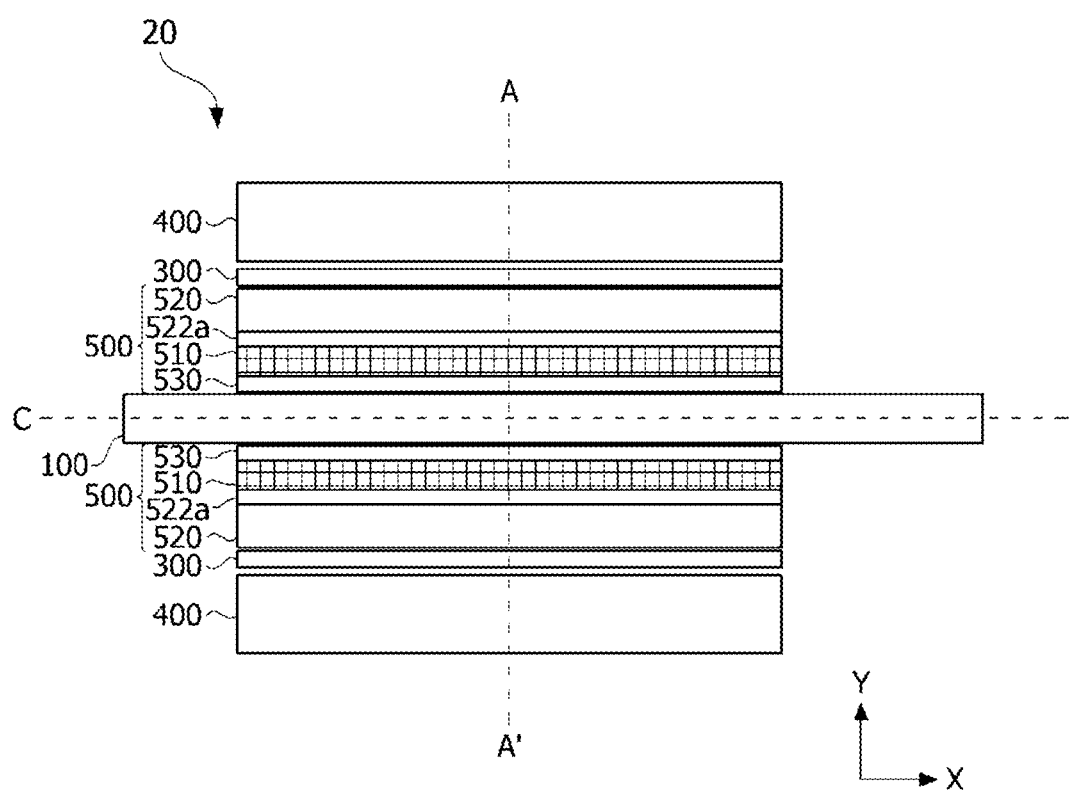
FIG. 14 is a side cross-sectional view of a motor according to a third embodiment of the present invention.

FIG. 14 is a side cross-sectional view of a motor according to a third embodiment of the present invention.

Further, as shown in FIG. 14, a non-pattern rotor core portion 530 in which a pattern is not formed may be disposed between a patterned portion 510 and a rotary shaft 100.

Meanwhile, a jig hole (not shown) on which a jig for assembly is seated may be formed in the patterned portion 510.

The outer contour portion 520 forms the outermost contour of a rotor 500 and includes an outer circumferential surface 521 and an inner circumferential surface 522.

The outer circumferential surface 521 faces a stator 400, and the inner circumferential surface 522 faces a central axis C.

Further, a plurality of magnets 300 are disposed on the outer circumferential surface 521, and a plurality of protrusion portions 522a and 522b protrude toward the central axis C from the inner circumferential surface 522.

Meanwhile, guide protrusions (not shown) which guide disposition of the plurality of magnets 300 may be formed on the outer circumferential surface 521.

Here, referring to FIG. 12, the plurality of magnets 300 may include a first magnet 310, a second magnet 320, and a third magnet 330 disposed to be adjacent to and spaced apart from each other along the outer circumferential surface 521 of the outer contour portion 520.

The first magnet 310 and the second magnet 320 may be spaced apart from each other on the outer circumferential surface 521 of the outer contour portion 520 to form a first separation portion S1. Further, the second magnet 320 and the third magnet 330 may be spaced apart from each other on the outer circumferential surface 521 of the outer contour portion 520 to form a second separation portion S2.

Here, as shown in FIG. 12, on the cross-sectional view, the first separation portion S1 may have a predetermined area through a virtual straight line which connects upper portions of the first magnet 310 and the second magnet 320. Further, the second separation portion S2 may have a predetermined area through a virtual straight line which connects upper portions of the second magnet 320 and the third magnet 330.

Meanwhile, the first separation portion S1 and the second separation portion S2 may have the same area.

Further, as shown in FIG. 12, the plurality of protrusion portions 522a and 522b may include a first protrusion portion 522a and a second protrusion portion 522b disposed to be adjacent to and spaced apart from each other along the inner circumferential surface 522 of the outer contour portion 520.

Each of the first protrusion portion 522a and the second protrusion portion 522b is formed to protrude in a first direction which extends toward the central axis C of the rotor 500 from the inner circumferential surface 522 of the outer contour portion 520.

Here, all of the outer contour portion 520 and the first protrusion portion 522a and the second protrusion portion 522b may be integrally composed.

That is, in an area in which the first protrusion portion 522a and the second protrusion portion 522b are formed in the first direction, a thickness of the outer contour portion 520 may be formed to be greater in comparison with an area in which the first protrusion portion 522a and the second protrusion portion 522b are not formed.

Accordingly, structural strength of the outer contour portion 520 of the rotor 500 may be secured.

Here, a width of the first protrusion portion 522a or the second protrusion portion 522b in a second direction which is perpendicular to the first direction may be gradually or gradationally decreased in a direction closer to the central axis C of the rotor 500.

That is, an area ratio of the patterned portion 510 may be maximized at the inside of the rotor 500 to reduce the weight, and an area ratio of the outer contour portion 520 may be increased at the outside of the rotor 500 to decrease the structural strength and magnetic resistance.

Meanwhile, the first protrusion portion 522a may be disposed in a virtual straight line L1 which connects the central axis C of the rotor 500 and a center of the first separation portion S1, and the second protrusion portion 522b may be disposed in in a virtual straight line L2 which connects the central axis C of the rotor 500 and a center of the second separation portion S2.

Meanwhile, in the same cross-section, an area of the first protrusion portion 522a may be formed to be 110% to 350% of an area of the first separation portion S1. Further, in the same cross-section, an area of the second protrusion portion 522b may be formed to be 110% to 350% of an area of the second separation portion S2

Here, when the area of the first protrusion portion 522a is formed to be smaller than or equal to 110% of the area of the first separation portion S1, since the magnetic resistance increases in the outer contour portion 520 of the rotor 500 corresponding to the first separation portion S1 in which the magnets 300 are not disposed due to a magnetic saturation phenomenon, a problem that the performance of the motor 20 is reduced is difficult to inhibit.

Further, when the area of the first protrusion portion 522a is formed to be greater than or equal to 350% of the area of the first separation portion S1, since the thickness and area of the outer contour portion 520 in which the first protrusion portion 522a is formed increase excessively, there is a problem in that the weight reduction of the motor 20 may not be maintained.

Meanwhile, in the first direction, the outer contour portion 520 may have a first thickness T1, the first protrusion portion 522a may have a second thickness T2, and the first thickness T1 may be formed to be 80% to 110% of the second thickness T2.

Here, when the first thickness T1 of the outer contour portion 520 is set to be smaller than or equal to 80% of the second thickness T2 of the first protrusion portion 522a, since the magnetic resistance increases in the outer contour portion 520 of the rotor 500 corresponding to the first separation portion S1 in which the magnets 300 are not disposed due to the magnetic saturation phenomenon, the problem that the performance of the motor 20 is reduced is difficult to inhibit.

Further, when the first thickness T1 of the outer contour portion 520 is set to be greater than or equal to 110% of the second thickness T2 of the first protrusion portion 522a, since the thickness and area of the outer contour portion 520 in which the first protrusion portion 522a is formed increase excessively, there is a problem in that the weight reduction of the motor 20 may not be maintained.

Meanwhile, as shown in FIGS. 12 and 13, since a size of each of the plurality of unit patterns 511 of the patterned portion 510 is formed to be very small in comparison with a size of each of the first protrusion portion 522a and the second protrusion portion 522b, the plurality of unit patterns 511 may be disposed between the first protrusion portion 522a and the second protrusion portion 522b.

Further, on the virtual first straight line L1, the plurality of unit patterns 511 may be disposed between the central axis C of the rotor 500 and the first protrusion portion 522a.

In addition, on the virtual second straight line L2, the plurality of unit patterns 511 may be disposed between the central axis C of the rotor 500 and the second protrusion portion 522b.

Accordingly, the rotor 500 may be lightened. Here, maximum lengths W3 and W4 of the unit patterns 511 among lengths which are measured in various directions may be roughly set to 0.5 mm to 5 mm, the maximum length W3 of the unit pattern 511 may be formed to be 5% to 50% of a maximum length D1 of lengths D of the first protrusion portion 522a or second protrusion portion 522b which are measured in various directions, and structural reliability of the rotor 500 may be secured through a honeycomb structure formed by the plurality of unit patterns 511 disposed to surround the first protrusion portion 522a and the second protrusion portion 522b.

The magnets 300 may be disposed on the outer circumferential surface 521 of the outer contour portion 520 of the rotor 500.

Further, the magnets 300 may be magnetized into a plurality of poles. The magnets 300 may cause signals for detecting a rotating position of the rotor 500. Further, the magnet 300 may be implemented in a ring shape.

The stator 400 may include a second through hole into which the rotary shaft 100, the rotor 500, and the magnets 300 are inserted. The rotary shaft 100, the rotor 500, and the magnets 300 may be disposed in the second through hole of the stator 400.

The stator 400 may have the greatest diameter in comparison with the rotary shaft 100, the rotor 500, and the magnets 300 with respect to the central axis C.

Although the above-described embodiments are mainly described with reference to the embodiments of the present invention, the above are only exemplary, and it should be understood that those skilled in the art may variously perform modifications and applications within the principle of the embodiments. For example, elements specifically shown in the embodiments may be modified. Further, differences related to modifications and changes should be understood as being included in the scope of the present invention defined in the appended claims.

The invention claimed is:
1. A motor comprising:
a stator including a through hole;
a cylindrical rotor disposed in the through hole;
a rotor center axis formed in a central region of the cylindrical rotor and to which a rotary shaft is coupled; and
a first magnet and a second magnet disposed between the stator and the rotor,
wherein the cylindrical rotor includes an outer contour portion and a patterned portion disposed between the outer contour portion and the rotor center axis, and wherein the patterned portion includes a plurality of unit patterns and a plurality of hollow portions disposed in each of the plurality of unit patterns, respectively, wherein the outer contour portion includes an inner circumferential surface that comes in contact with the plurality of unit patterns, wherein the inner circumferential surface of the outer contour portion includes a first protrusion portion protruding in a radial direction towards the rotor center axis, and wherein a width of the first protrusion portion, taken in a lateral direction perpendicular to the radial direction, decreases in a direction towards the rotor center axis.

2. The motor of claim 1, wherein:
the outer contour portion includes an outer circumferential surface on which the first magnet and the second magnet are disposed; and
a maximum length of the first protrusion portion in the radial direction is greater than a maximum length of each of the unit patterns.

3. The motor of claim 2, wherein:
a first separation portion formed as a space between the first magnet and the second magnet is included on the outer circumferential surface of the outer contour portion; and
the first protrusion portion is disposed in a first virtual straight line that connects the rotor center axis and a center of the first separation portion.

4. The motor of claim 3, wherein at least a portion of the plurality of unit patterns of the patterned portion are disposed in the first virtual straight line that connects the rotor center axis and the center of the first separation portion.

5. The motor of claim 2, wherein the inner circumferential surface of the outer contour portion includes a second protrusion portion that is spaced apart from the first protrusion portion and protrudes in the radial direction.

6. The motor of claim 5, comprising a third magnet disposed between the stator and the cylindrical rotor,
wherein the third magnet is adjacent to the second magnet.

7. The motor of claim 6, comprising a second separation portion formed as a space between the second magnet and the third magnet,
wherein the second protrusion portion is disposed in a second virtual straight line that connects the rotor center axis and a center of the second separation portion.

8. The motor of claim 7, wherein at least a portion of the plurality of unit patterns of the patterned portion are disposed in the second virtual straight line that connects the rotor center axis and the center of the second separation portion.

9. The motor of claim 7, wherein a first separation portion formed as a space between the first magnet and the second magnet is included on the outer circumferential surface of the outer contour portion, and
wherein a size of a cross section of one of the first protrusion portion and the second protrusion portion is 110% to 350% of a size of a cross section of one of the first separation portion and the second separation portion.

10. The motor of claim 7, wherein a width of one of the first protrusion portion and the second protrusion portion in a lateral direction that is perpendicular to the radial direction decreases in a direction towards the rotor center axis.

11. The motor of claim 7, wherein:
the outer contour portion has a first thickness in the radial direction;
one of the first protrusion portion and the second protrusion portion in the radial direction has a second thickness; and
the first thickness is 80% to 110% of the second thickness.

12. The motor of claim 11, wherein the first thickness is smaller than the second thickness.

13. The motor of claim 1, wherein the patterned portion is exposed to the outside of the cylindrical rotor.

14. A motor comprising:
a stator including a through hole;
a cylindrical rotor disposed in the through hole;
a rotor center axis formed in a central region of the rotor and to which a rotary shaft is coupled;
a first magnet and a second magnet disposed between the stator and the rotor; and
a third magnet disposed between the stator and the rotor,
wherein the rotor includes an outer contour portion and a patterned portion disposed between the outer contour portion and the center axis of the rotor,
wherein the patterned portion includes a plurality of unit patterns and a hollow portion disposed in each of the unit patterns,
wherein the outer contour portion includes an outer circumferential surface on which the first magnet, the second magnet, and the third magnet are disposed and an inner circumferential surface that comes in contact with the plurality of unit patterns,
wherein the inner circumferential surface of the outer contour portion includes a first protrusion portion protruding in a radial direction toward the rotor center axis and a second protrusion portion that is disposed adjacent to the first protrusion portion and protrudes in the radial direction, and
wherein at least a portion of the plurality of unit patterns of the patterned portion is disposed between the first protrusion portion and the second protrusion portion.

15. The motor of claim 14, comprising a second separation portion formed as a space between the second magnet and the third magnet,
wherein the second protrusion portion is disposed in a second virtual straight line that connects the rotor center axis and a center of the second separation portion.

16. The motor of claim 15, wherein at least a portion of the plurality of unit patterns of the patterned portion are disposed in the second virtual straight line that connects the rotor center axis and the center of the second separation portion.

17. The motor of claim 1, wherein the patterned portion is disposed to come into contact with the rotary shaft.

18. A motor comprising:
a stator including a through hole;
a cylindrical rotor disposed in the through hole;
a rotor center axis formed in a central region of the rotor and to which a rotary shaft is coupled; and
a first magnet and a second magnet disposed between the stator and the rotor,
wherein the rotor includes an outer contour portion and a patterned portion disposed between the outer contour portion and the center axis of the rotor,
wherein the patterned portion includes a plurality of unit patterns and a hollow portion disposed in each of the unit patterns, and wherein a diameter ratio between a diameter of the outer contour portion from the rotary shaft and a diameter of the patterned portion from the rotary shaft is smaller than 1:0.5.

19. The motor of claim 1, wherein:

each hollow portion of the plurality of hollow portions includes a plurality of sides; and a maximum length of each side of the plurality of sides is 1 mm to 1.75 mm.

20. The motor of claim 19, wherein:

the patterned portion includes a first frame disposed in a direction of the rotary shaft and a second frame disposed in a direction perpendicular to the direction of the rotary shaft; and an interval between facing sides among the plurality of sides is greater than a minimum interval between adjacent hollow portions of the plurality of hollow portions.

\* \* \* \* \*